Dec. 16, 1947. A. J. WEATHERHEAD, JR 2,432,598

HOSE END

Filed March 16, 1945

INVENTOR.
ALBERT J. WEATHERHEAD, JR.

BY Bosworth + Sessions

ATTORNEYS

Patented Dec. 16, 1947

2,432,598

UNITED STATES PATENT OFFICE 2,432,598

HOSE END

Albert J. Weatherhead, Jr., Shaker Heights, Ohio, assignor to The Weatherhead Company, Cleveland, Ohio, a corporation of Ohio Application March 16, 1945, Serial No. 583,119

12 Claims. (Cl. 285—84)

This invention relates to hose couplings and methods of making same, and more particularly to couplings or fittings for connecting the ends of flexible hoses, such as hoses composed of rubber or rubber-like materials and reinforced with fabric or wire, to other fluid conduits such as tubes of copper, aluminum or steel.

A general object of the invention is the provision of a hose coupling of this character which will make a strong, secure, leak-proof and durable connection with a hose and which can be manufactured rapidly and at relatively low cost. Another object is the provision of a method of making such couplings. Another object is to provide a hose and coupling or fitting which is made up of inexpensive stampings and automatic screw machine parts. Another object is to provide a coupling of this character and composed of parts which can be assembled rapidly and economically by operations such as crimping and spot welding. A further object is to provide a coupling in which the machining operations can be carried out on the several parts before they are assembled together, thus reducing the time and expense of the machining. A further object is to provide a hose coupling which will require a minimum amount of machine work. Another object is to provide a hose coupling in which the hose clamping sleeve is composed of a strong and ductile metal which can be readily deformed into engagement with the hose, whereas another part of the coupling may be composed of free machining material.

Figure 1:
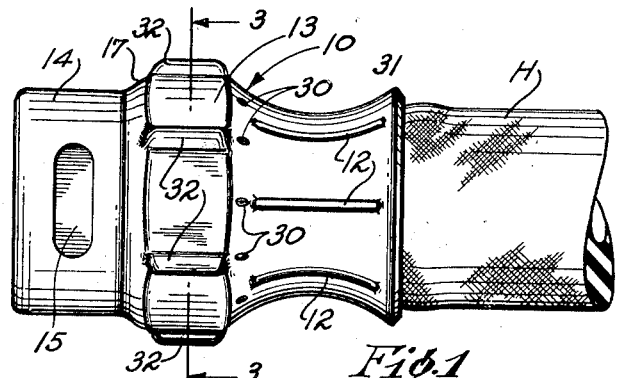
Figure 3:
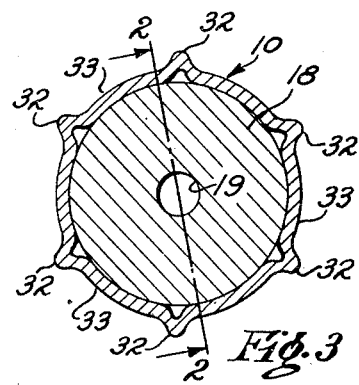
Figure 2:
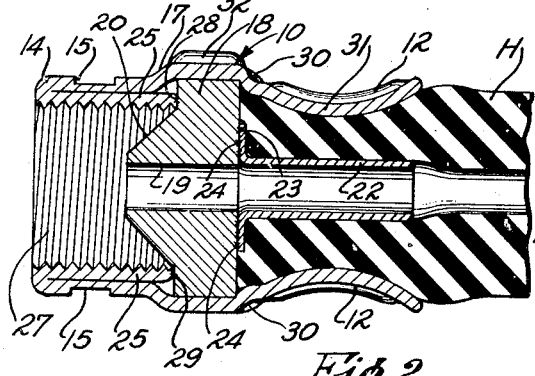
Figure 4:
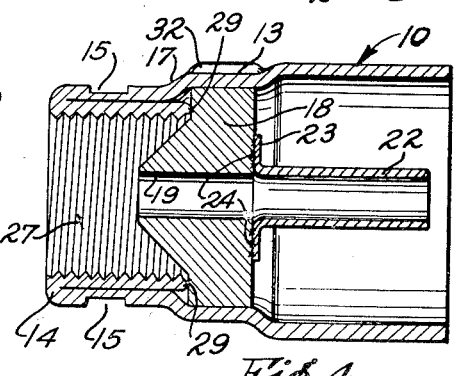
Figure 5:
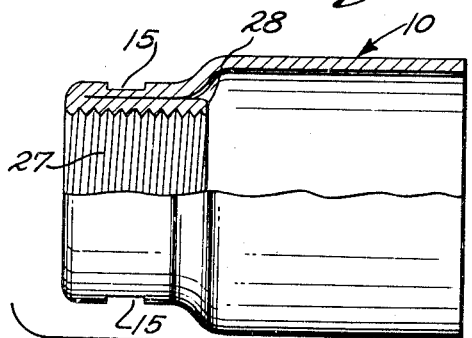
Figure 5:
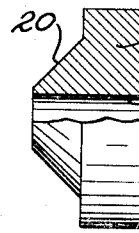
Figure 5:
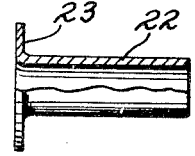
Figure 6:
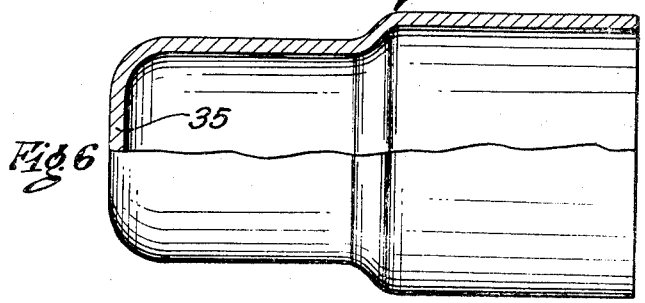

Further objects and advantages of my invention will become apparent from the following description of a preferred form thereof, reference being made to the accompanying drawings in which Figure 1 is an elevation of a completed assembly embodying a flexible hose to which a preferred form of coupling is secured; Figure 2 is a longitudinal section through the hose coupling of Figure 1, the section being taken as indicated by line 2—2 of Figure 3; Figure 3 is a transverse section taken along the line 3—3 of Figure 1; Figure 4 is a longitudinal section through the coupling showing the coupling before it has been secured to the end of a hose; Figure 5 illustrates the several parts making up the coupling of Figure 1, the parts being shown partly in section; and Figure 6 is a view partially in section showing the coupling sleeve in one stage of the manufacturing operation.

Briefly, my present invention contemplates a coupling of the type in which the hose is secured within the coupling by a sleeve member which is deformed inwardly to compress the hose against an internal standpipe or nipple extending within the bore of the hose. It is ordinary practice, in the manufacture of couplings of this general type, to machine the body portion and sleeve assembly from a single piece of bar stock. According to the present invention, I produce couplings of the same general type by forming the sleeve and the exterior part of the body portion from a single stamping made in the form of a drawn cup or tube. At one end, the sleeve stamping is preferably provided with threads for connecting the coupling to a flared tube or other fluid conduit. The interior of the body portion (hereinafter called the body insert) is machined from bar stock, while the standpipe or nipple is a separately formed stamping preferably welded to one side of the body insert, while the other side of the insert provides a seat for a flared tube or the like. The sleeve member is crimped into engagement with the body insert to retain the insert in place and also to provide a wrench-engaging surface on the exterior of the fitting. The sleeve is also crimped or otherwise deformed into engagement with the hose, and this deforming operation clamps the hose against the nipple and further secures the body insert within the sleeve. By this method of manufacture, a great deal of machining is eliminated, and the assemblies can be produced rapidly and at low cost.

Referring to the drawings, in Figures 1 and 2, the fitting is shown as secured to a flexible hose H. The fitting comprises an outer sleeve member indicated generally at 10 and having a hose engaging portion which is deformed inwardly into engagement with the hose preferably by crimping, the crimping operation leaving ribs 12 on the exterior of this portion of the sleeve. The sleeve also has a central portion 13 and an internally threaded end portion 14 which functions to couple the hose to another fluid conduit, the threads being adapted to receive a conventional coupling nut (not shown) or other male coupling member. In order to provide for mounting the coupling in an apertured plate, the portion 14 of the sleeve may be provided with oppositely disposed milled slots 15. The provision of the slots 15 makes it possible to insert the portion 14 of the coupling through an apertured plate with the tapered shoulder 17 in engagement with one side of the plate. A spring securing clip such as a clip of the type shown in the Baldwin Patent No. 1,875,209, issued August 30, 1932, may be utilized to retain the coupling in position, the legs of the slip engaging within the slots 15 and the base portion of the clip engaging the plate.

As shown particularly in Figure 2, the interior of the body of the hose coupling preferably comprises the body unit 18 having a central bore 19 and terminating in a conical seating surface 20 which is disposed within the internally threaded end 14 of the sleeve 10. The sleeve and the body together thus form the female part of flared tube coupling of the inverted type. At the opposite side of the body insert 18 from the seating surface 20, the nipple or standpipe 22 is provided. This projects into the bore of the hose H and is preferably provided with a flange 23 welded to the radial surface of the body insert 18 as indicated diagrammatically at 24. The standpipe is preferably in the form of a stamping, such stampings being produced rapidly and at very low cost by eyelet-making machines of well known construction. As one side of the body insert provides the seat for connecting the coupling to another fluid conduit, while the standpipe is joined in leak-proof relationship to the other side, it is not necessary to provide a leak-proof connection between the sleeve and body insert.

It will be noted that while the material of which the sleeve is composed is of substantially uniform thickness throughout, the coupling end 14 of the sleeve 10 is of double thickness, this result preferably being accomplished by folding or doubling inwardly the end of a tubular blank upon itself to provide the inwardly extending portion 25. The additional thickness thus produced gives added strength to the sleeve, provides the thickness required for threads 27 and slots 15 and furnishes a shoulder or stop 28 against which the body insert 18 abuts. In order to secure the insert firmly in place, the insert may be welded to the shoulder 28 as indicated diagrammatically in the drawings at 29. If desired, the sleeve may be staked as at 30 during the operation of crimping the portion 31 of the sleeve into engagement with the hose. The indentations 30 clamp the insert against the shoulder 28; thus when the staking operation is employed it may be unnecessary to weld the insert to the shoulder 28.

The sleeve and body are additionally secured together by crimping the intermediate portion 13 of the sleeve into firm engagement with the insert. Preferably this operation is carried out so as to provide a wrench engaging surface on the coupling. This is accomplished by making at least the portion of the sleeve in the zone surrounding the insert initially of somewhat greater diameter than the outside diameter of the insert 18 and then subjecting the sleeve to a crimping operation to give it the form shown particularly in Figure 3. As there shown, the crimping operation is preferably carried out to provide six equally spaced projections 32 on the exterior of the intermediate portion 13 of the sleeve 10. These projections extend parallel to the axis of the coupling and project outwardly beyond the intermediate arcuate portions 33 of the sleeve to a sufficient extent that a straight line drawn between any two adjacent projections 32 will either clear the intermediate arcuate portion 33 or be just tangent thereto. This arrangement in effect provides the coupling with a generally hexagonal portion which can be readily engaged by a conventional wrench.

The fitting, before the hose is secured therein, is illustrated in Figure 4. It will be noted that the diameter of the sleeve 10 is reduced slightly in the region 13. This reduction in diameter is accomplished in the crimping operation just described. The form of the sleeve prior to the crimping operation is shown in Figure 5 whereIn the several parts making up the fitting are illustrated in their condition just prior to assembly. It will be noted that all of the machining operations on the several parts are completed. Thus the slots 15 are milled in the end 14 of the sleeve, and the inwardly folded inner surface of the end 14 has been provided with the threads 27. The threading operation in particular can be carried out much easier before assembly of the sleeve with the inner body member 18, for in the absence of the body member 18, the threading tap can be a conventional solid tap which can cut the threads all the way to the end 28 of the inwardly turned portion 25 of the sleeve. In producing a conventional female fitting of this sort, it is ordinarily necessary to provide a hollow tap to receive the conical seat of the fitting. The sleeve 10 can be produced at low cost by a stamping or drawing operation starting with flat stock. The stock is drawn into a hollow member as indicated in Figure 6 and then a portion of the bottom 35 is punched out and the remainder turned inwardly to form the inwardly turned portion 25 of the completed sleeve.

The remaining parts of the coupling may also be produced rapidly and inexpensively. Thus the body insert 18 may be turned out of round bar stock on an automatic screw machine, while as noted above, the standpipe or insert 22 may be formed by a stamping operation on conventional eyelet machining machinery. The operations of welding the standpipe 22 to the insert 18 and of welding the insert to the shoulder 28 may be carried out by spot welding equipment provided with appropriate electrodes and jigs. The crimping operation may be carried out at high speed in suitable machines.

Thus the several parts making up the coupling are arranged so that they can be manufactured and assembled in quantities at relatively low cost. Furthermore, there is little waste of material in the manufacturing operations, for much of the machining ordinarily necessary in the manufacture of couplings is eliminated, and the parts are made of inexpensive flat stock and round bar stock. The separate formation of the body insert and the sleeve enables these parts to be made out of materials best suited for their particular functions. Thus the body insert can be machined from high sulphur free machining stock, while a ductile deep drawing stock may be used for the sleeve 10, such material being ideally suited for the subsequent operation of crimping to secure the hose within the coupling. The sleeve member has ample thickness for threading and slotting at one end, while the other end is of the proper thickness to be deformed into clamping engagement with the hose.

Various changes and modifications within the scope and spirit of my invention will be apparent to those skilled in the art. It is, therefore, to be understood that the foregoing description is given by way of example only and that my patent is not limited thereto or in any manner other than by the scope of the appended claims.

1. A hose coupling comprising a generally tubular open-ended sleeve member composed of material of substantially uniform wall thickness throughout, the wall of the member being doubled inwardly upon itself adjacent one end thereof to provide an end portion composed of two thicknesses of material and terminating in an inner shoulder, said doubled end portion being internally threaded, said sleeve member also having a portion at its other end adapted to engage the exterior of a hose and an intermediate portion having a plurality of longitudinally extending ribs providing a wrench engaging surface, a body insert disposed within the intermediate portion of said sleeve member and having a radial surface abutting said inner shoulder and a conical seating surface adjacent said internally threaded portion and a standpipe projecting from the other end thereof within the hose engaging portion of said sleeve member and adapted to be disposed within the bore of a hose.

2. A hose coupling comprising a generally tubular open-ended sleeve member composed of material of substantially uniform wall thickness throughout, the wall of the member being doubled inwardly upon itself adjacent one end thereof to provide an end portion composed of two thicknesses of material and terminating in an inner shoulder, said doubled end portion being internally threaded and having two oppositely disposed transversely extending grooves, said sleeve member also having a portion at its other end adapted to be deformed into clamping engagement with the exterior of a hose and an intermediate portion providing a wrench engaging surface of greater external diameter than said doubled end portion, there being an external shoulder between said portions, a body insert disposed within the intermediate portion of said sleeve member and having a radial surface abutting said inner shoulder, a conical seating surface on one end thereof adjacent said internally threaded portion and a standpipe projecting from the other end of said body insert within the hose engaging portion of said sleeve member, said sleeve member being deformed inwardly to secure said body insert therein.

3. A hose coupling comprising a generally tubular, open-ended sleeve member, the wall of the member being doubled inwardly upon itself adjacent one end thereof to provide an end portion composed of two thicknesses of material terminating in an inner shoulder, said doubled end portion being threaded, said sleeve member also having a portion at its other end adapted to engage the exterior of a hose and an intermediate portion, a body insert disposed within the intermediate portion of said sleeve member and having a radial surface abutting said inner shoulder, said insert being welded to said inner shoulder and the intermediate portion of said sleeve member being deformed inwardly to engage said body insert and to provide a plurality of longitudinally extending protuberant ribs on said intermediate portion.

4. A hose coupling comprising a generally tubular, open-ended sleeve member composed of ductile material, the wall of the member being doubled inwardly upon itself adjacent one end thereof to provide an end portion composed of two thicknesses of material terminating in an inner shoulder, said doubled end portion being threaded, said sleeve member also having a portion at its other end adapted to engage the exterior of a hose and an intermediate portion, a body insert disposed within the intermediate portion of said sleeve member and adapted to engage the end of a hose within said sleeve and to engage a fluid conduit secured to said threaded end and having a radial surface abutting said inner shoulder, the intermediate portion of said sleeve member being deformed inwardly to engage said body insert and to provide a plurality of longitudinally extending protuberant ribs on said intermediate portion.

5. A hose coupling comprising a generally tubular, open-ended sleeve member, the wall of the member being doubled inwardly upon itself adjacent one end thereof to provide an end portion composed of two thicknesses of material terminating in an inner shoulder, said doubled end portion being threaded, said sleeve member also having a portion at its other end adapted to engage the exterior of a hose and an intermediate portion, a body insert disposed within the intermediate portion of said sleeve member and having a radial surface abutting said inner shoulder, said insert being welded to said inner shoulder.

6. A hose coupling comprising a sleeve member having a threaded portion at one end, a portion at the other end adapted to engage the exterior of a hose, and an intermediate portion, a body insert disposed within the intermediate portion of said sleeve member and having a seating surface on the end thereof adjacent said threaded portion and a standpipe projecting from the other end thereof within the hose engaging portion of said sleeve member and adapted to be disposed within the bore of a hose, said sleeve member being deformed inwardly to secure said body insert therein.

7. A hose coupling comprising a sleeve member having two end portions and an intermediate portion, one end portion being adapted to engage the exterior of a hose, the other end portion being provided with means for connecting it to another instrumentality, and a body insert disposed within said intermediate portion, said intermediate portion being deformed inwardly into engagement with said body insert and having a non-circular, wrench engaging exterior surface.

8. A hose coupling comprising a sleeve member having two end portions and an intermediate portion, one end portion being adapted to engage the exterior of a hose, the other end portion being provided with means for connecting it to another instrumentality, and a body insert disposed within said intermediate portion, said body insert having a circular external surface engaging the inner surface of the said intermediate portion, said intermediate portion having a non-circular, wrench engaging exterior surface.

9. A hose coupling according to claim 8 wherein the intermediate portion of the sleeve is crimped inwardly into engagement with the body insert and the exterior of the intermediate portion is provided with a plurality of axially extending, protuberant ribs.

10. A hose coupling according to claim 8 wherein the intermediate portion of the sleeve is crimped inwardly into engagement with the body insert and the exterior of the intermediate portion is provided with a plurality of axially extending, protuberant ribs, the portions between the ribs being arcuate in cross-section and the ribs projecting at least far enough beyond the arcuate portions so that lines drawn between any two adjacent ribs will be substantially tangent to the exterior surface of the arcuate portion between such ribs.

11. A hose coupling comprising a sleeve member having a threaded portion at one end, a portion at the other end adapted to engage the exterior of a hose, and an intermediate abutment portion, a body insert disposed within said sleeve member having shoulder means engaging said abutment portion, said insert having a seating surface formed thereon at the end adjacent said threaded portion, said seating surface being formed to seal against a detachable fluid coupling member, and a standpipe projecting from the other end of said insert, said standpipe extending within the hose engaging portion of said sleeve member and adapted to be disposed within the bore of a hose, said sleeve member being deformed to grip said body insert.

12. A hose coupling comprising a sleeve member having a threaded portion at one end, a portion at the other end adapted to engage the exterior of a hose, and an intermediate abutment portion, a body insert disposed within said sleeve member having a shoulder means engaging said abutment portion, said insert having a conical seating surface formed thereon at the end adjacent said threaded portion, said seating surface being formed to seal against a detachable fluid coupling member, and a standpipe projecting from the other end of said insert, said standpipe extending within the hose engaging portion of said sleeve member and adapted to be disposed within the bore of a hose, said sleeve member being deformed inwardly to secure said body therein.

ALBERT J. WEATHERHEAD, Jr.

REFERENCES CITED

The following references are of record in the file of this patent:

UNITED STATES PATENTS

| Number | Name | Date |
| --- | --- | --- |
| 1,187,461 | Knox | June 13, 1916 |
| 2,025,427 | Weatherhead | Dec. 24, 1935 |
| 2,202,421 | Wolf | Aug. 11, 1942 |
| 2,321,991 | Butler | June 15, 1943 |
| 1,707,891 | Allison | Apr. 2, 1929 |
| 2,000,680 | Weatherhead | May 7, 1935 |
| 2,328,696 | Voglesong | Sept. 7, 1943 |
| 2,211,147 | Miller | Aug. 13, 1940 |

Certificate of Correction

Patent No. 2,432,598.　　　　　　　　　　　　　　　　　　　December 16, 1947.

ALBERT J. WEATHERHEAD, Jr.

It is hereby certified that error appears in the printed specification of the above numbered patent requiring correction as follows: Column 7, line 12, claim 12, after the word "having" strike out "a"; and that the said Letters Patent should be read with this correction therein that the same may conform to the record of the case in the Patent Office.

Signed and sealed this 4th day of May, A. D. 1948.

[SEAL]

THOMAS F. MURPHY,
*Assistant Commissioner of Patents.*